United States Patent
Truelson

(12) 
(10) Patent No.: US 6,223,191 B1
(45) Date of Patent: Apr. 24, 2001

(54) METHOD AND APPARATUS FOR AUTOMATICALLY FORMATTING MULTIPLE LINES OF TEXT IN A WORD PROCESSOR

(75) Inventor: Roy Willfred Truelson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/022,964

(22) Filed: Feb. 12, 1998

(51) Int. Cl.[7] ............................. G06F 17/27; G06F 17/21
(52) U.S. Cl. ........................ 707/517; 707/519; 707/531
(58) Field of Search ................................... 707/517, 518, 707/519, 530, 531

(56) References Cited

U.S. PATENT DOCUMENTS

| | | | |
|---|---|---|---|
| 4,575,813 | 3/1986 | Bartlett et al. | 364/900 |
| 4,608,664 | 8/1986 | Bartlett et al. | 364/900 |
| 5,784,008 | 7/1998 | Raguseo | 341/20 |

OTHER PUBLICATIONS

"Eliminating Optical Effects in Computer Printing." IBM Technical Disclosure Bulletin, vol. 31 No. 12. Published May 1, 1989. pp. 35–39.

"Right Margin Controls." IBM Technical Disclosure Bulletin, vol. 27 No. 1A. Published Jun. 1, 1984. pp. 126–128.

*Primary Examiner*—Joseph H. Feild
*Assistant Examiner*—Michael J. Perkins
(74) *Attorney, Agent, or Firm*—Roy W. Truelson

(57) ABSTRACT

A text formatter for a word processor formats text as groups of words, a group being more than a single line at a time. The formatter determines the minimum number of lines required to hold the formatted group. In general, each line contains the maximum number of words that will fit, consistent with the applicable formatting parameters such as margins, font size, etc. However, the formatter may override this and move a word or portion of a word onto a subsequent line, even though it would fit on the original line, provided that the minimum number of lines required to format the group is not thereby exceeded. This is done in order to reduce hyphenation, letter spacing, or other undesirable formatting effects. Preferably, an entire paragraph is formatted as a group. The formatter generates multiple permutations of possible formatted text lines, assigning a weighted value to each permutation, and pruning undesirable permutations. The unpruned permutations are used to generate permutations of the next succeeding line of text. The set of permuted lines having the most desirable cumulative weighted value within the predetermined minimum number of lines is chosen as the best formatting.

25 Claims, 28 Drawing Sheets

The examiner's action will be complete as to all matters, except that in appropriate circumstances, such as misjoinder of invention, fundamental defects in the application, and the like, the action of the examiner may be limited to such matters before further action is made. However, matters of form need not be raised by the examiner until a claim is found allowable.

FIG. 5A (PRIOR ART)

The examiner's action will be complete as to all matters, except that in appropriate circumstances, such as misjoinder of invention, fundamental defects in the application, and the like, the action of the examiner may be limited to such matters before further action is made. However, matters of form need not be raised by the examiner until a claim is found allowable.

FIG. 5B

| | | | |
|---|---|---|---|
| → | 1A | The examiner's action will be com- | 0 + 0 + 0 + 20 = 20 |
| → | 1B | The examiner's action will be | 0 + 1 + 5 + 0 = 6 |
| → | 1C | The examiner's action will | 0 + 2 + 5 + 0 = 7 |
| → | 1D | The examiner's action | 0 + 3 + 40 + 0 = 43 |

FIG. 6A

|  |  |  |  |  |
|---|---|---|---|---|
| 2A | | 1A + | plete as to all matters, except that in | 20 + 0 + 0 + 0 = 20 |
| 2B | ▲ | 1A + | plete as to all matters, except that | 20 + 1 + 0 + 0 = 21 |
| 2C | | 1A + | plete as to all matters, except | 20 + 2 + 5 + 0 = 27 |
| 2D | | 1A + | plete as to all matters, ex- | 20 + 3 + 5 + 25 = 53 |
| 2E | ▲ | 1A + | plete as to all matters, | 20 + 4 + 40 + 0 = 64 |
| 2F | ▲ | 1B + | complete as to all matters, except that | 6 + 1 + 0 + 0 = 7 |
| 2G | | 1B + | complete as to all matters, except | 6 + 2 + 0 + 0 = 8 |
| 2H | | 1B + | complete as to all matters, ex- | 6 + 3 + 5 + 25 = 39 |
| 2I | | 1B + | complete as to all matters, | 6 + 4 + 20 + 0 = 30 |
| 2J | | 1B + | complete as to all mat- | 6 + 5 + 40 + 20 = 71 |
| 2K | ▲ | 1C + | be complete as to all matters, except | 7 + 2 + 0 + 0 = 9 |
| 2L | ▲ | 1C + | be complete as to all matters, ex- | 7 + 3 + 0 + 25 = 35 |
| 2M | ▲ | 1C + | be complete as to all matters, | 7 + 4 + 5 + 0 = 16 |
| 2N | | 1C + | be complete as to all matters, | 7 + 5 + 5 + 20 = 37 |
| 2O | ▲ | 1C + | be complete as to all mat- | 7 + 6 + 40 + 0 = 53 |
| 2P | | 1D + | will be complete as to all matters, ex- | 43 + 3 + 0 + 25 = 71 |
| 2Q | | 1D + | will be complete as to all matters, | 43 + 4 + 0 + 0 = 47 |
| 2R | | 1D + | will be complete as to all mat- | 43 + 5 + 5 + 20 = 73 |
| 2S | | 1D + | will be complete as to all | 43 + 6 + 5 + 0 = 54 |
| 2T | ▲ | 1D + | will be complete as to | 43 + 7 + 40 + 0 = 90 |

FIG. 6B

| | | | |
|---|---|---|---|
| 3A | 2A + | appropriate circumstances, such as | 20 + 0 + 5 + 0 = 25 |
| 3B | 2A + | appropriate circumstances, such | 20 + 1 + 5 + 0 = 26 |
| 3C | 2A + | appropriate circumstances, | 20 + 2 + 40 + 0 = 62 |
| 3D ▲ | 2F + | in appropriate circumstances, such as | 7 + 0 + 0 + 0 = 7 |
| 3E | 2F + | in appropriate circumstances, such | 7 + 1 + 5 + 0 = 13 |
| 3F | 2F + | in appropriate circumstances, | 7 + 2 + 20 + 0 = 29 |
| 3G | 2F + | in appropriate circumstanc- | 7 + 3 + 40 + 25 = 75 |
| 3H ▲ | 2G + | that in appropriate circumstances, such | 8 + 1 + 0 + 0 = 9 |
| 3I ▲ | 2G + | that in appropriate circumstances, | 8 + 2 + 5 + 0 = 15 |
| 3J ▲ | 2G + | that in appropriate circumstanc- | 8 + 3 + 5 + 25 = 41 |
| 3K | 2G + | that in appropriate circum- | 8 + 4 + 20 + 20 = 52 |
| 3L | 2G + | that in appropriate cir- | 8 + 5 + 40 + 20 = 73 |
| 3M | 2L + | cept that in appropriate circumstances, | 35 + 2 + 0 + 0 = 37 |
| 3N | 2L + | cept that in appropriate circumstanc- | 35 + 3 + 0 + 25 = 63 |
| 3O | 2L + | cept that in appropriate circum- | 35 + 4 + 5 + 20 = 64 |
| 3P | 2L + | cept that in appropriate cir- | 35 + 5 + 5 + 20 = 65 |
| 3Q | 2L + | cept that in appropriate | 35 + 6 + 40 + 0 = 81 |
| 3R | 2M + | except that in appropriate circumstanc- | 16 + 3 + 0 + 25 = 44 |

FIG. 6C-1

|     |                                                              |                      |
| --- | ------------------------------------------------------------ | -------------------- |
| 3S  | 2M + except that in appropriate circum-                      | 16 + 4 + 0 + 20 = 40 |
| 3T  | 2M + except that in appropriate cir-                         | 16 + 5 + 5 + 20 = 46 |
| 3U  | 2M + except that in appropriate                              | 16 + 6 + 40 + 0 = 62 |
| 3V  | 2N + ters, except that in appropriate circum-                | 37 + 4 + 0 + 20 = 61 |
| 3W  | 2N + ters, except that in appropriate cir-                   | 37 + 5 + 0 + 20 = 62 |
| 3X  | 2N + ters, except that in appropriate                        | 37 + 6 + 5 + 0 = 48 |
| 3Y  | 2N + ters, except that in appropri-                          | 37 + 7 + 5 + 20 = 69 |
| 3Z  | 2N + ters, except that in appro-                             | 37 + 8 + 20 + 20 = 85 |
| 3AA | 2N + ters, , except that in ap-                              | 37 + 9 + 40 + 25 = 111 |
| 3AB | 2O + matters, except that in appropriate cir-                | 53 + 5 + 0 + 20 = 78 |
| 3AC | 2O + matters, except that in appropriate                     | 53 + 6 + 0 + 0 = 59 |
| 3AD | 2O + matters, except that in appropri-                       | 53 + 7 + 5 + 20 = 85 |
| 3AE | 2O + matters, except that in appro-                          | 53 + 8 + 5 + 20 = 86 |
| 3AF | 2O + matters, except that in ap-                             | 53 + 9 + 20 + 25 = 107 |
| 3AG | 2T + all matters, except that in appropriate                 | 90 + 6 + 0 + 0 = 96 |
| 3AH | 2T + all matters, except that in appropri-                   | 90 + 7 + 0 + 20 = 117 |
| 3AI | 2T + all matters, except that in appro-                      | 90 + 8 + 5 + 20 = 123 |
| 3AJ | 2T + all matters, except that in ap-                         | 90 + 9 + 5 + 25 = 129 |

FIG. 6C-2

|     |       |                                              |                          |
|-----|-------|----------------------------------------------|--------------------------|
| 4A  | 3D +  | misjoinder of invention, fundamental         | 7 + 0 + 0 + 0 = 7        |
| 4B  | 3D +  | misjoinder of invention, fundamen-           | 7 + 1 + 0 + 20 = 28      |
| 4C  | 3D +  | misjoinder of invention, funda-              | 7 + 2 + 5 + 20 = 34      |
| 4D  | 3D +  | misjoinder of invention, fun-                | 7 + 3 + 20 + 20 = 50     |
| 4E  | 3D +  | misjoinder of invention,                     | 7 + 4 + 40 + 0 = 51      |
| 4F  | 3H +  | as misjoinder of invention, fundamen-        | 9 + 1 + 0 + 20 = 30      |
| 4G  | 3H +  | as misjoinder of invention, funda-           | 9 + 2 + 0 + 20 = 31      |
| 4H  | 3H +  | as misjoinder of invention, fun-             | 9 + 3 + 5 + 20 = 37      |
| 4I  | 3H +  | as misjoinder of invention,                  | 9 + 4 + 40 + 0 = 53      |
| 4J  | 3I +  | such as misjoinder of invention, fundam,     | 15 + 2 + 0 + 20 = 37     |
| 4K  | 3I +  | such as misjoinder of invention, fun-        | 15 + 3 + 0 + 20 = 38     |
| 4L  | 3I +  | such as misjoinder of invention,             | 15 + 4 + 5 + 0 = 24      |
| 4M  | 3I +  | such as misjoinder of inven-                 | 15 + 5 + 5 + 20 = 45     |
| 4N  | 3I +  | such as misjoinder of in-                    | 15 + 6 + 40 + 25 = 86    |
| 4O  | 3J +  | es, such as misjoinder of invention,         | 41 + 4 + 0 + 0 = 45      |
| 4P  | 3J +  | es, such as misjoinder of inven-             | 41 + 5 + 5 + 20 = 71     |
| 4Q  | 3J +  | es, such as misjoinder of in-                | 41 + 6 + 5 + 25 = 77     |
| 4R  | 3J +  | es, such as misjoinder of                    | 41 + 7 + 40 + 0 = 88     |

FIG. 6D-1

| | | | |
|---|---|---|---|
| 4S | 3S + | stances, such as misjoinder of inven- | 40 + 5 + 0 + 20 = 65 |
| 4T | 3S + | stances, such as misjoinder of in- | 40 + 6 + 0 + 25 = 71 |
| 4U | 3S + | stances, such as misjoinder of | 40 + 7 + 5 + 0 = 52 |
| 4V | 3S + | stances, such as misjoinder | 40 + 8 + 40 + 0 = 88 |
| 4W | 3T + | cumstances, such as misjoinder of in- | 46 + 6 + 0 + 25 = 77 |
| 4X | 3T + | cumstances, such as misjoinder of | 46 + 7 + 0 + 0 = 53 |
| 4Y | 3T + | cumstances, such as misjoinder | 46 + 8 + 5 + 0 = 59 |
| 4Z | 3T + | cumstances, such as misjoin- | 46 + 9 + 20 + 20 = 95 |
| 4AA | 3T + | cumstances, such as mis- | 46 + 10 + 40 + 20 = 116 |
| 4AB | 3X + | circumstances, such as misjoinder of | 48 + 7 + 0 + 0 = 55 |
| 4AC | 3X + | circumstances, such as misjoinder | 48 + 8 + 5 + 0 = 61 |
| 4AD | 3X + | circumstances, such as misjoin- | 48 + 9 + 5 + 20 = 82 |
| 4AE | 3X + | circumstances, such as mis- | 48 + 10 + 40 + 20 = 118 |
| 4AF | 3Y + | ate circumstances, such as misjoinder | 69 + 8 + 0 + 0 = 77 |
| 4AG | 3Y + | ate circumstances, such as misjoin- | 69 + 9 + 0 + 20 = 98 |
| 4AH | 3Y + | ate circumstances, such as mis- | 69 + 10 + 5 + 20 = 104 |
| 4AI | 3Z + | priate circumstances, such as misjoin- | 85 + 9 + 0 + 20 = 114 |
| 4AJ | 3Z + | priate circumstances, such as mis- | 85 + 10 + 0 + 20 = 115 |
| 4AK | 3AF+ | propriate circumstances, such as mis- | 107 + 10 + 0 + 20 = 137 |

FIG. 6D-2

| | | | |
|---|---|---|---|
| 5A | 4A + | defects in the application, and the like, | 7 + 0 + 0 + 0 = 7 |
| 5B | 4A + | defects in the application, and the | 7 + 1 + 0 + 0 = 8 |
| 5C | 4A + | defects in the application, and | 7 + 2 + 5 + 0 = 14 |
| 5D | 4A + | defects in the application, | 7 + 3 + 40 + 0 = 50 |
| 5E | 4B + | tal defects in the application, and the | 28 + 1 + 0 + 0 = 29 |
| 5F | 4B + | tal defects in the application, and | 28 + 2 + 0 + 0 = 30 |
| 5G | 4B + | tal defects in the application, | 28 + 3 + 5 + 0 = 36 |
| 5H | 4B + | tal defects in the applica- | 28 + 4 + 40 + 20 = 92 |
| 5I | 4G + | mental defects in the application, and | 31 + 2 + 0 + 0 = 33 |
| 5J | 4G + | mental defects in the application, | 31 + 3 + 5 + 0 = 39 |
| 5K | 4G + | mental defects in the applica- | 31 + 4 + 5 + 20 = 60 |
| 5L | 4G + | mental defects in the appli- | 31 + 5 + 20 + 20 = 76 |
| 5M | 4G + | mental defects in the ap- | 31 + 6 + 40 + 25 = 102 |
| 5N | 4H + | damental defects in the application, | 37 + 3 + 0 + 0 = 40 |
| 5O | 4H + | damental defects in the applica- | 37 + 4 + 5 + 20 = 66 |
| 5P | 4H + | damental defects in the appli- | 37 + 5 + 5 + 20 = 67 |
| 5Q | 4H + | damental defects in the ap- | 37 + 6 + 20 + 25 = 88 |
| 5R | 4H + | damental defects in the | 37 + 7 + 40 + 0 = 84 |
| 5S | 4L + | fundamental defects in the application, | 24 + 3 + 0 + 0 = 27 |
| 5T | 4L + | fundamental defects in the applica- | 24 + 4 + 0 + 20 = 48 |
| 5U | 4L + | fundamental defects in the appli- | 24 + 5 + 5 + 20 = 54 |

| | | | |
|---|---|---|---|
| 5V | 4L + | fundamental defects in the ap- | 24 + 6 + 5 + 25 = 60 |
| 5W | 4L + | fundamental defects in the | 24 + 7 + 40 + 0 = 71 |
| 5X | 4M + | tion, fundamental defects in the appli- | 45 + 5 + 0 + 20 = 70 |
| 5Y | 4M + | tion, fundamental defects in the ap- | 45 + 6 + 0 + 25 = 76 |
| 5Z | 4M + | tion, fundamental defects in the | 45 + 7 + 5 + 0 = 57 |
| 5AA | 4M + | tion, fundamental defects in | 45 + 8 + 20 + 0 = 73 |
| 5AB | 4M + | tion, fundamental defects | 45 + 9 + 40 + 0 = 94 |
| 5AC | 4T + | vention, fundamental defects in the ap- | 71 + 6 + 0 + 25 = 102 |
| 5AD | 4T + | vention, fundamental defects in the | 71 + 7 + 0 + 0 = 78 |
| 5AE | 4T + | vention, fundamental defects in | 71 + 8 + 5 + 0 = 84 |
| 5AF | 4T + | vention, fundamental defects | 71 + 9 + 40 + 0 = 120 |
| 5AG | 4U + | invention, fundamental defects in the | 52 + 7 + 0 + 0 = 59 |
| 5AH | 4U + | invention. fundamental defects in | 52 + 8 + 5 + 0 = 65 |
| 5AI | 4U + | invention, fundamental defects | 52 + 9 + 20 + 0 = 81 |
| 5AJ | 4U + | invention, fundamental de- | 52 + 10 + 40 + 25 = 127 |
| 5AK | 4Y + | of invention, fundamental defects in | 59 + 8 + 0 + 0 = 67 |
| 5AL | 4Y + | of invention, fundamental defects | 59 + 9 + 5 + 0 = 73 |
| 5AM | 4Y + | of invention, fundamental de- | 59 + 10 + 20 + 25 = 114 |
| 5AN | 4AD+ | der of invention, fundamental defects | 82 + 9 + 0 + 0 = 91 |
| 5AO | 4AD+ | der of invention, fundamental de- | 82 + 10 + 5 + 25 = 122 |
| 5AP | 4AH+ | joinder of invention, fundamental de- | 104 + 10 + 0 + 25 = 139 |

| | | | |
|---|---|---|---|
| 6A | 5A + | the action of the examiner may be lim- | 7 + 0 + 0 + 20 = 27 |
| 6B | 5A + | the action of the examiner may be | 7 + 1 + 0 + 0 = 8 |
| 6C | 5A+ | the action of the examiner may | 7 + 2 + 5 + 0 = 14 |
| 6D | 5A + | the action of the examiner | 7 + 3 + 20 + 0 = 30 |
| 6E | 5A + | the action of the examin- | 7 + 4 + 40 + 25 = 76 |
| 6F | 5B + | like, the action of the examiner may be | 8 + 1 + 0 + 0 = 9 |
| 6G | 5B + | like, the action of the examiner may | 8 + 2 + 0 + 0 = 10 |
| 6H | 5B + | like, the action of the examiner | 8 + 3 + 5 + 0 = 16 |
| 6I | 5B + | the action of the examin- | 8 + 4 + 5 + 25 = 42 |
| 6J | 5B + | the action of the exam- | 8 + 5 + 5 + 20 = 38 |
| 6K | 5B + | the action of the ex- | 8 + 6 + 20 + 25 = 59 |
| 6L | 5B + | like, the action of the | 8 + 7 + 40 + 0 = 55 |
| 6M | 5C + | the like, the action of the examiner | 14 + 3 + 0 + 0 = 17 |
| 6N | 5C + | the like, the action of the examin- | 14 + 4 + 0 + 25 = 43 |
| 6O | 5C + | the like, the action of the exam- | 14 + 5 + 5 + 20 = 44 |
| 6P | 5C + | the like, the action of the ex- | 14 + 6 + 5 + 25 = 50 |
| 6Q | 5C + | the like, the action of the | 14 + 7 + 5 + 0 = 26 |
| 6R | 5C + | the like, the action of | 14 + 8 + 40 + 0 = 62 |
| 6S | 5G + | and the like, the action of the examiner | 36 + 3 + 0 + 0 = 39 |
| 6T | 5G + | and the like, the action of the examin- | 36 + 4 + 0 + 25 = 65 |
| 6U | 5G + | and the like, the action of the exam- | 36 + 5 + 0 + 20 = 61 |
| 6V | 5G + | and the like, the action of the ex- | 36 + 6 + 0 + 25 = 67 |

FIG. 6F-i-1

| | | | |
|---|---|---|---|
| 6W | 5G + | and the like, the action of the | 36 + 7 + 5 + 0 = 48 |
| 6X | 5G + | and the like, the action of | 36 + 8 + 5 + 0 = 49 |
| 6Y | 5G + | and the like, the action | 36 + 9 + 40 + 0 = 85 |
| 6Z | 5T + | tion, and the like, the action of the ex- | 48 + 6 + 0 + 25 = 79 |
| 6AA | 5T + | tion, and the like, the action of the | 48 + 7 + 0 + 0 = 55 |
| 6AB | 5T + | tion, and the like, the action of | 48 + 8 + 5 + 0 = 61 |
| 6AC | 5T + | tion, and the like, the action | 48 + 9 + 5 + 0 = 62 |
| 6AD | 5T + | tion, and the like, the ac- | 48 + 10 + 20 + 25 = 103 |
| 6AE | 5T + | tion, and the like, the | 48 + 11 + 40 + 0 = 99 |
| 6AF | 5U + | cation, and the like, the action of the | 54 + 7 + 0 + 0 = 61 |
| 6AG | 5U + | cation, and the like, the action of | 54 + 8 + 0 + 0 = 62 |
| 6AH | 5U + | cation, and the like, the action | 54 + 9 + 5 + 0 = 68 |
| 6AI | 5U + | cation, and the like, the ac- | 54 + 10 + 5 + 25 = 94 |
| 6AJ | 5U + | cation, and the like, the | 54 + 11 + 40 + 0 = 105 |
| 6AK | 5V + | plication, and the like, the action of the | 60 + 7 + 0 + 0 = 67 |
| 6AL | 5V + | plication, and the like, the action of | 60 + 8 + 0 + 0 = 68 |
| 6AM | 5V + | plication, and the like, the action | 60 + 9 + 0 + 0 = 69 |
| 6AN | 5V + | plication, and the like, the ac- | 60 + 10 + 5 + 25 = 100 |
| 6AO | 5V + | plication, and the like, the | 60 + 11 + 40 + 0 = 111 |
| 6AP | 5Z + | application, and the like, the action of | 57 + 8 + 0 + 0 = 65 |
| 6AQ | 5Z + | application, and the like, the action | 57 + 9 + 0 + 0 = 66 |
| 6AR | 5Z + | application, and the like, the ac- | 57 + 10 + 5 + 25 = 97 |

FIG. 6F-i-2

| | | |
|---|---|---|
| 6AS | 5Z + application, and the like, the | 57 + 11 + 5 + 0 = 73 |
| 6AT | 5AH+ the application, and the like, the action | 65 + 9 + 0 + 0 = 74 |
| 6AU | 5AH+ the application, and the like, the ac- | 65 + 10 + 0 + 25 = 100 |
| 6AV | 5AH+ the application, and the like, the | 65 + 11 + 5 + 0 = 81 |
| 6AW | 5AL+ in the application, and the like, the ac- | 73 + 10 + 0 + 25 = 108 |
| 6AX | 5AL+ in the application, and the like, the | 73 + 11 + 0 + 0 = 84 |

FIG. 6F-ii

| | | | |
|---|---|---|---|
| ▸ 7A | 6A + | ited to such matters before further ac- | 27 + 0 + 0 + 25 = 52 |
| 7B | 6A + | ited to such matters before further | 27 + 1 + 0 + 0 = 28 |
| 7C | 6A + | ited to such matters before fur- | 27 + 2 + 5 + 20 = 54 |
| 7D | 6A + | ited to such matters before | 27 + 3 + 20 + 0 = 50 |
| 7E | 6A + | ited to such matters be- | 27 + 4 + 40 + 25 = 96 |
| ▸ 7F | 6B + | limited to such matters before further | 8 + 1 + 0 + 0 = 9 |
| 7G | 6B + | limited to such matters before fur- | 8 + 2 + 0 + 20 = 30 |
| 7H | 6B + | limited to such matters before | 8 + 3 + 5 + 0 = 16 |
| 7I | 6B + | limited to such matters be- | 8 + 4 + 20 + 25 = 57 |
| 7J | 6B + | limited to such matters | 8 + 5 + 40 + 0 = 53 |
| ▸ 7K | 6G + | be limited to such matters before fur- | 10 + 2 + 0 + 20 = 32 |
| 7L | 6G + | be limited to such matters before | 10 + 3 + 0 + 0 = 13 |
| ▸ 7M | 6G + | be limited to such matters be- | 10 + 4 + 5 + 25 = 44 |
| 7N | 6G + | be limited to such matters | 10 + 5 + 20 + 0 = 35 |
| 7O | 6G + | be limited to such mat- | 10 + 6 + 40 + 20 = 76 |
| ▸ 7P | 6H + | may be limited to such matters before | 16 + 3 + 0 + 0 = 19 |
| 7Q | 6H + | may be limited to such matters be- | 16 + 4 + 0 + 25 = 45 |
| ▸ 7R | 6H + | may be limited to such matters | 16 + 5 + 5 + 0 = 26 |
| ▸ 7S | 6H + | may be limited to such mat- | 16 + 6 + 5 + 20 = 47 |
| 7T | 6H + | may be limited to such | 16 + 7 + 40 + 0 = 63 |
| 7U | 6I + | er may be limited to such matters be- | 42 + 4 + 0 + 25 = 71 |
| 7V | 6I + | er may be limited to such matters | 42 + 5 + 0 + 0 = 47 |

|   |   |   |   |
|---|---|---|---|
| 7W | 6I + | er may be limited to such mat- | 42 + 6 + 5 + 20 = 73 |
| 7X | 6I + | er may be limited to such | 42 + 7 + 5 + 0 = 54 |
| 7Y | 6I + | er may be limited to | 42 + 8 + 40 + 0 = 90 |
| 7Z | 6J + | iner may be limited to such matters be- | 38 + 4 + 0 + 25 = 67 |
| 7AA | 6J + | iner may be limited to such matters | 38 + 5 + 0 + 0 = 43 |
| 7AB | 6J + | iner may be limited to such mat- | 38 + 6 + 0 + 20 = 64 |
| 7AC | 6J + | iner may be limited to such | 38 + 7 + 5 + 0 = 50 |
| 7AD | 6J + | iner may be limited to | 38 + 8 + 40 + 0 = 86 |
| 7AE | 6P + | aminer may be limited to such matters | 50 + 5 + 0 + 0 = 55 |
| 7AF | 6P + | aminer may be limited to such mat- | 50 + 6 + 0 + 20 = 76 |
| 7AG | 6P + | aminer may be limited to such | 50 + 7 + 5 + 0 = 62 |
| 7AH | 6P + | aminer may be limited to | 50 + 8 + 40 + 0 = 98 |
| 7AI | 6Q + | examiner may be limited to such mat- | 26 + 6 + 0 + 20 = 52 |
| 7AJ | 6Q + | examiner may be limited to such | 26 + 7 + 0 + 0 = 33 |
| 7AK | 6Q + | examiner may be limited to | 26 + 8 + 5 + 0 = 39 |
| 7AL | 6Q + | examiner may be limited | 26 + 9 + 40 + 0 = 75 |
| 7AM | 6X + | the examiner may be limited to such | 49 + 7 + 0 + 0 = 56 |
| 7AN | 6X + | the examiner may be limited to | 49 + 8 + 5 + 0 = 62 |
| 7AO | 6X + | the examiner may be limited | 49 + 9 + 5 + 0 = 63 |
| 7AP | 6X + | the examiner may be limit- | 49 + 10 + 20 + 25 = 104 |
| 7AQ | 6AC+ | of the examiner may be limited to such | 62 + 7 + 0 + 0 = 69 |
| 7AR | 6AC+ | of the examiner may be limited to | 62 + 8 + 0 + 0 = 70 |

FIG. 6G-i-2

| | | |
|---|---|---|
| 7AS | 6AC+ of the examiner may be limited | 62 + 9 + 5 + 0 = 76 |
| 7AT | 6AC+ of the examiner may be limit- | 62 + 10 + 5 + 25 = 102 |
| 7AU | 6AI + tion of the examiner may be limited to | 94 + 8 + 0 + 0 = 102 |
| 7AV | 6AI + tion of the examiner may be limited | 94 + 9 + 0 + 0 = 103 |
| 7AW | 6AI + tion of the examiner may be limit- | 94 + 10 + 0 + 25 = 129 |
| 7AX | 6AV+ action of the examiner may be limited | 81 + 9 + 0 + 0 = 90 |
| 7AY | 6AV+ action of the examiner may be limit- | 81 + 10 + 0 + 25 = 116 |

FIG. 6G-ii

| | | | |
|---|---|---|---|
| 8A | 7A + | tion is made. However, matters of form | 52 + 0 + 0 + 0 = 52 |
| 8B | 7A + | tion is made. However, matters of | 52 + 1 + 0 + 0 = 53 |
| 8C | 7A + | tion is made. However, matters | 52 + 2 + 5 + 0 = 59 |
| 8D | 7A + | tion is made. However, mat- | 52 + 3 + 5 + 20 = 80 |
| 8E | 7A + | tion is made. However, | 52 + 4 + 40 + 0 = 96 |
| 8F | 7F + | action is made. However, matters of | 9 + 1 + 0 + 0 = 10 |
| 8G | 7F + | action is made. However, matters | 9 + 2 + 5 + 0 = 16 |
| 8H | 7F + | action is made. However, mat- | 9 + 3 + 5 + 20 = 37 |
| 8I | 7F + | action is made. However, | 9 + 4 + 40 + 0 = 53 |
| 8J | 7G + | ther action is made. However, matters | 30 + 2 + 0 + 0 = 32 |
| 8K | 7G + | ther action is made. However, mat- | 30 + 3 + 0 + 20 = 53 |
| 8L | 7G + | ther action is made. However, | 30 + 4 + 5 + 0 = 39 |
| 8M | 7G + | ther action is made. Howev- | 30 + 5 + 5 + 25 = 65 |
| 8N | 7G + | ther action is made. How- | 30 + 6 + 5 + 20 = 61 |
| 8O | 7G + | t h e r  a c t i o n  i s  m a d e . | 30 + 7 + 40 + 0 = 77 |
| 8P | 7L + | further action is made. However, mat- | 13 + 3 + 0 + 20 = 36 |
| 8Q | 7L + | further action is made. However, | 13 + 4 + 5 + 0 = 22 |
| 8R | 7L + | further action is made. Howev- | 13 + 5 + 5 + 25 = 48 |
| 8S | 7L + | further action is made. How- | 13 + 6 + 5 + 20 = 44 |
| 8T | 7L + | f u r t h e r  a c t i o n  i s  m a d e . | 13 + 7 + 40 + 0 = 60 |

| | | | |
|---|---|---|---|
| 8U | 7M + | fore further action is made. However, | 44 + 4 + 0 + 0 = 48 |
| 8V | 7M + | fore further action is made. Howev- | 44 + 5 + 0 + 25 = 74 |
| 8W | 7M + | fore further action is made. How- | 44 + 6 + 0 + 20 = 70 |
| 8X | 7M + | fore further action is made. | 44 + 7 + 20 + 0 = 71 |
| 8Y | 7M + | fore further action is | 44 + 8 + 40 + 0 = 92 |
| 8Z | 7R + | before further action is made. Howev- | 26 + 5 + 0 + 25 = 56 |
| 8AA | 7R + | before further action is made. How- | 26 + 6 + 0 + 20 = 52 |
| ▲ 8AB | 7R + | before further action is made. | 26 + 7 + 5 + 0 = 38 |
| 8AC | 7R + | before further action is | 26 + 8 + 40 + 0 = 74 |
| 8AD | 7S + | ters before further action is made. | 47 + 7 + 0 + 0 = 54 |
| 8AE | 7S + | ters before further action is | 47 + 8 + 20 + 0 = 75 |
| 8AF | 7S + | ters before further action | 47 + 9 + 40 + 0 = 96 |
| 8AG | 7AJ+ | matters before further action is made. | 33 + 7 + 0 + 0 = 40 |
| ▲ 8AH | 7AJ+ | matters before further action is | 33 + 8 + 5 + 0 = 46 |
| 8AI | 7AJ+ | matters before further action | 33 + 9 + 20 + 0 = 62 |
| 8AJ | 7AK+ | such matters before further action is | 39 + 8 + 0 + 0 = 47 |
| ▲ 8AK | 7AK+ | such matters before further action | 39 + 9 + 5 + 0 = 53 |
| 8AL | 7AO+ | to such matters before further action is | 63 + 8 + 0 + 0 = 71 |
| 8AM | 7AO+ | to such matters before further action | 63 + 9 + 0 + 0 = 72 |
| 8AN | 7AT+ | ed to such matters before further action | 102 + 9 + 0 + 0 = 111 |

Rows 8U–8AN bracketed as group A.

| | | | |
|---|---|---|---|
| ▲ | 9A | 8A + need not be raised by the examiner | 52 + 0 + 0 + 0 = 52 |
| | 9B | 8A + need not be raised by the examin- | 52 + 1 + 0 + 25 = 78 |
| | 9C | 8A + need not be raised by the exam- | 52 + 2 + 0 + 20 = 74 |
| | 9D | 8A + need not be raised by the ex- | 52 + 3 + 5 + 25 = 85 |
| | 9E | 8A + need not be raised by the | 52 + 4 + 20 + 0 = 76 |
| | 9F | 8A + need not be raised by | 52 + 5 + 40 + 0 = 97 |
| ▲ | 9G | 8F + form need not be raised by the examin- | 10 + 1 + 0 + 25 = 36 |
| ▲ | 9H | 8F + form need not be raised by the exam- | 10 + 2 + 0 + 20 = 32 |
| ▲ | 9I | 8F + form need not be raised by the ex- | 10 + 3 + 0 + 25 = 38 |
| ▲ | 9J | 8F + form need not be raised by the | 10 + 4 + 5 + 0 = 19 |
| ▲ | 9K | 8F + form need not be raised by | 10 + 5 + 5 + 0 = 20 |
| | 9L | 8F + form need not be raised | 10 + 6 + 40 + 0 = 56 |
| | 9M | 8G + of form need not be raised by the ex- | 16 + 3 + 0 + 25 = 44 |
| | 9N | 8G + of form need not be raised by the | 16 + 4 + 0 + 0 = 20 |
| | 9O | 8G + of form need not be raised by | 16 + 5 + 5 + 0 = 26 |
| ▲ | 9P | 8G + of form need not be raised | 16 + 6 + 5 + 0 = 27 |
| | 9Q | 8G + of form need not be | 16 + 7 + 40 + 0 = 63 |
| | 9R | 8P + ters of form need not be raised by the | 36 + 4 + 0 + 0 = 40 |
| | 9S | 8P + ters of form need not be raised by | 36 + 5 + 0 + 0 = 41 |

$$
A \begin{cases}
9T & 8P + \text{ters of form need not be raised} & 36 + 6 + 5 + 0 = 47 \\
9U & 8P + \text{ters of form need not be} & 36 + 7 + 20 + 0 = 63 \\
9V & 8P + \text{ters of form need not} & 36 + 8 + 40 + 0 = 84 \\
9W & 8Q + \text{matters of form need not be raised by} & 22 + 5 + 0 + 0 = 27 \\
9X & 8Q + \text{matters of form need not be raised} & 22 + 6 + 0 + 0 = 28 \\
9Y & 8Q + \text{matters of form need not be} & 22 + 7 + 5 + 0 = 34 \\
9Z & 8Q + \text{matters of form need not} & 22 + 8 + 40 + 0 = 70 \\
9AA & 8R + \text{er, matters of form need not be raised} & 48 + 6 + 0 + 0 = 54 \\
9AB & 8R + \text{er, matters of form need not be} & 48 + 7 + 5 + 0 = 60 \\
9AC & 8R + \text{er, matters of form need not} & 48 + 8 + 5 + 0 = 61 \\
9AD & 8R + \text{er, matters of form need} & 48 + 9 + 40 + 0 = 97 \\
9AE & 8S + \text{ever, matters of form need not be} & 44 + 7 + 0 + 0 = 51 \\
9AF & 8S + \text{ever, matters of form need not} & 44 + 8 + 5 + 0 = 57 \\
9AG & 8S + \text{ever, matters of form need} & 44 + 9 + 20 + 0 = 73 \\
9AI & 8AB+ \text{However, matters of form need not be} & 38 + 7 + 0 + 0 = 45 \\
9AJ & 8AB+ \text{However, matters of form need not} & 38 + 8 + 0 + 0 = 46 \\
9AK & 8AB+ \text{However, matters of form need} & 38 + 9 + 5 + 0 = 52 \\
9AL & 8AH+ \text{made. However, matters of form need} & 46 + 9 + 0 + 0 = 57
\end{cases}
$$

| | | | |
|---|---|---|---|
| 10A | 9A + | until a claim is found allowable. | 52 + 0 + 0 + 0 = 52 |
| 10B | 9G + | er until a claim is found allowable. | 36 + 0 + 0 + 0 = 36 |
| 10C | 9H + | iner until a claim is found allowable. | 32 + 0 + 0 + 0 = 32 |

FIG. 6J

The Minnesota High School League recommends the wearing of mouthguards for your safety when participating in contact sports.

FIG. 7A (PRIOR ART)

The Minnesota High School League recommends the wearing of mouthguards for your safety when participating in contact sports.

FIG. 7B

METHOD AND APPARATUS FOR AUTOMATICALLY FORMATTING MULTIPLE LINES OF TEXT IN A WORD PROCESSOR

FIELD OF THE INVENTION

The present invention relates to electronic word processing devices, and in particular to the formatting of textual material for printing, display, or the like.

BACKGROUND OF THE INVENTION

Word processing involves the creation, editing, storage, and output of textual documents. Word processing is frequently performed using a general-purpose digital computer, executing an applications program having word processing function. Such a general purpose computer may be anything from a large mainframe connected to hundreds of individual terminals, to a stand alone personal computer. Word processing may also be performed using single-purpose electronic word processing devices. As used herein, the term "word processor" shall encompass any of the above implementations.

One of the major tasks of any word processor is to format the document for output. Output can take many forms, but most frequently output will be either printed on paper or displayed on a computer screen.

When formatting a document for output, the word processor must determine where to end each line of text. Typically, a user will input parameters such as the location of margins, size of font, whether or not to hyphenate, etc., and the word processor will automatically determine where to end each line based on these parameters. Most word processors follow a simple "maximum fit" algorithm, attempting to cram as much as possible onto each line before going on to the next line. I.e., they sequentially examine each line of text, attempting to fit as many words or word segments as possible on the current line consistent with the formatting parameters. Once the determination is made with respect to a line, the formatter moves on to the next line. The formatter never reconsiders the formatting of a previous line. If hyphenation is specified by the user, the word processor will attempt to place a portion of the word on the current line if the entire word will not fit.

The maximum fit algorithm may be implemented in any of several ways. If full left/right justification is used, the fit may be determined initially assuming a minimum spacing between words, which is then expanded as necessary to fill available space. Alternatively, the fit may be determined initially assuming a nominal word spacing, which may be reduced by no more than a predetermined amount if doing so will make it possible to squeeze the last word segment onto the line, or expanded if the final segment will not fit in any case. Where ragged right justification is used, the nominal word spacing will typically be used, which is not subsequently modified.

The "maximum fit" algorithm described above has the advantage of formatting the output in the fewest possible number of lines (given the constraints of margins, fonts, etc.). However, it can lead to undesirably formatted output.

The problems with the "maximum fit" algorithm are particularly acute where full left/right justification is specified, and the column width (between margins) is relatively narrow. This is, for example, the norm used by newspapers and magazines. Where full justification is used, the amount of space between each word is adjusted in order to make each line of words exactly the same length. Sometimes, the amount of extra space is so great that letterspacing is required, i.e., small spaces must be placed between individual letters. Letterspacing gives the formatted output a strange appearance, and can make it more difficult to read. Letterspacing can be reduced if hyphenation is used, but excessive hyphenation can also make the output difficult to read.

Readability can be improved if hyphenation is prohibited. However, this causes the textual material to occupy a larger number of lines. In a newspaper and many other applications, space is at such a premium that this is generally considered an unacceptable solution.

This use of letterspacing and/or excessive hyphenation is now so familiar to most people that it has become accepted as a necessary annoyance that any newspaper reader has to put up with. However, an unrecognized need exists for improved general readability and appearance of newspapers and other formatted documents, without use of additional document space or reduction in type size. The present invention is directed toward this goal.

SUMMARY OF THE INVENTION

It is, therefore, an object of the present invention to provide an enhanced word processing method and apparatus.

Another object of this invention is to improve the appearance of formatted output of a word processor.

Another object of this invention is to make the formatted text output of a word processing device more readable to a human.

Another object of this invention is to reduce the occurrences of undesirable formatting characteristics in formatted text, such as hyphenation or letterspacing, without increasing the number of lines required to format the output.

A text formatter formats text by considering groups of words, a group being more than a single line at a time. A determination is made as to the minimum number of lines required to hold the formatted group. In general, each line contains the maximum number of words that will fit, consistent with the applicable formatting parameters such as margins, font size, etc. However, the formatter may override this and move a word or portion of a word onto a subsequent line, even though it would fit on the original line, provided that the minimum number of lines required to format the group is not thereby exceeded. This is done in order to reduce hyphenation, letterspacing, or other undesirable formatting effects.

In the preferred embodiment, an entire paragraph is formatted as a group. The formatter generates multiple permutations of possible formatted text lines, assigning a weighted value to each permutation. With each successive line of text, undesirable permutations are pruned. A permutation is pruned if it appears that it would cause the paragraph to format in more than the minimum number of lines; or if letterspacing has exceeded a given threshold; or if the weighted score is worse than the weighted score of another permutation which ends with the same word or word segment. The unpruned permutations are used to generate permutations of the next succeeding line of text. The set of permuted lines having the most desirable cumulative weighted value within the predetermined minimum number of lines is chosen as the best formatting.

In the preferred embodiment, the text formatter is one of the functions of a word processing program executing on a general purpose computer system.

In general, the resulting formatted text will be both easier to read and more aesthetically appealing because it will have fewer hyphenated words, letterspaced words, or related undesirable formatting characteristics. At the same time, the resulting formatted text will occupy a minimum number of lines (i.e., the same number of lines as text formatted with a maximum fit algorithm).

The details of the present invention, both as to its structure and operation, can best be understood in reference to the accompanying drawings, in which like reference numerals refer to like parts, and in which:

BRIEF DESCRIPTION OF THE DRAWING

FIGS. 5A and 5B show a first example of a paragraph of text, formatted according to a prior art "maximum fit" algorithm, and according to the preferred embodiment of the present invention, respectively.

FIGS. 6A through 6J represent different formatting permutations considered by the formatter in formatting the first example paragraph, according to the preferred embodiment.

FIGS. 7A and 7B show a second example paragraph of text, formatted according to a prior art "maximum fit" algorithm, and according to an alternative embodiment of the present invention, respectively.

DETAILED DESCRIPTION OF THE PREFERRED EMBODIMENT

Figure 1:
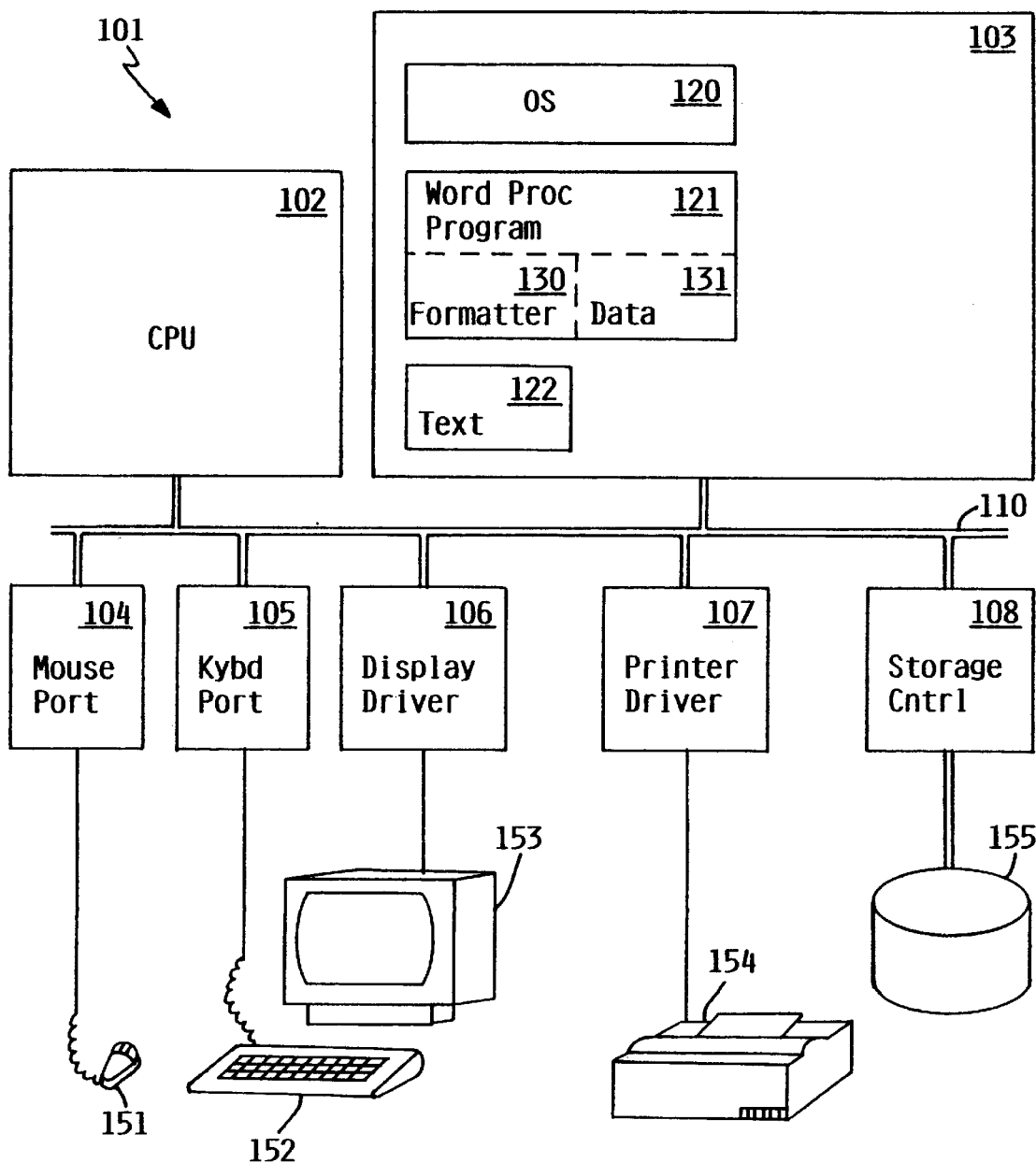
FIG. 1 shows the major components of a word processing system according to the preferred embodiment of the present invention.

FIG. 1 shows the major components of a word processing apparatus for practicing the present invention in accordance with the preferred embodiment. In this embodiment, the word processing apparatus is a software program executing on a general purpose digital computer. Computer 101 includes central processing unit (CPU) 102, random access memory 103, mouse port controller 104, keyboard port controller 105, display driver 106, printer driver 107, and storage controller 108, all coupled to bidirectional system communications bus 110. Bus 110 facilitates communications, i.e., transfer of data, among the various components of computer system 101.

CPU 102 is a general purpose programmable processor, such as an Intel® Pentium® processor commonly used in personal computers. Memory 103 is a random access memory sufficiently large to hold the necessary operating system, word processing program, and data. While memory 103 is shown as a single entity, it should be understood that memory 103 may in fact comprise a plurality of modules, and that memory may exist at multiple levels, from high-speed registers and caches to lower speed but larger DRAM chips.

Mouse port controller 104 and keyboard port controller 105 facilitate input of data by a user from either mouse 151 or keyboard 152. Specifically, text data is typically entered from keyboard 152. Display driver 106 outputs data to display 153, which is preferably a cathode ray tube graphics display, capable of displaying text in a variety of fonts and sizes. Printer driver 107 outputs data to printer 154. Printer 154 may be a laser printer, ink jet printer, or any of various alternative printing devices, also capable of printing text in a variety of fonts and sizes. Storage controller 108 manages the transfer of data to and from mass data storage device 155, which is preferably a rotating magnetic disk drive storage device.

As shown in FIG. 1, memory 103 contains operating system 120, word processing program 121, and text data file 122. Operating system 120 comprises a plurality of machine instructions which execute on processor 102 to control the operations of computer system 101 and provide a platform for the execution of one or more applications programs, such as word processing program 121. Operating system 120 may be a MICROSOFT® Windows® 95 operating system, an IBM® OS/2® operating system, or any of various alternative operating systems as are known in the art. Text data file 122 is a file of textual data capable of being edited and output by program 121. Text data file contains characters of text as well as formatting data which may specify such things as paper size, margins, fonts, paragraphing, tabs, etc. While operating system 120, program 121, and text data file 122 are shown contained in memory 103, it will be understood that, depending on the amount of memory available and the size of such files, only portions of such files may be loaded into memory at any given time, while other portions remain stored in storage device 155.

Word processing program 121 is preferably a full function applications program supporting the creation, editing, storage, and output of text data files. Many commercially available programs which support such functions are known in the art, e.g., MICROSOFT® Word and WORDPERFECT®. In addition to the conventional functions known in the art, word processing program 121 contains a formatting function (referred to as a formatter 130) for formatting text as described more fully herein. Formatter 130 comprises instructions executable on CPU 102 for performing the formatting function, and associated data structures 131. Selected data structures 131 are shown in greater detail in FIGS. 2A–2C.

For purposes of this specification, a "word segment" means the smallest grouping of sequential characters of text which must always appear together on a single line. If hyphenation is not allowed, a "word segment" is generally the same as a word. If hyphenation is allowed, a "word segment" is usually a syllable, although hyphenation in some cases may be restricted so that it is not allowed for all syllables. A "word segment" would also include the punctuation which must appear on the same line with a word, groups of digits representing a number, etc. A word group is a plurality of word segments spanning multiple lines of text which are formatted as a group as described herein. A word group may be a paragraph, or may be some other measure.

Figure 2A:
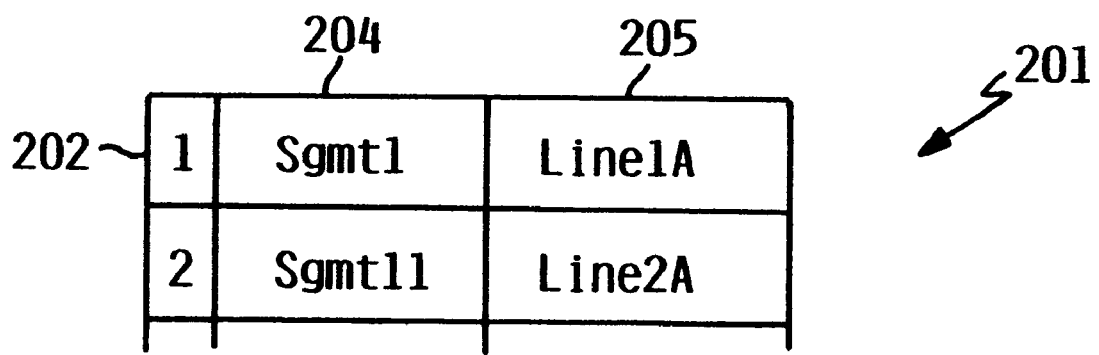
FIGS. 2A through 2C show in greater detail some of the data structures used by a formatter of a word processing system, according to the preferred embodiment.
Figure 2B:
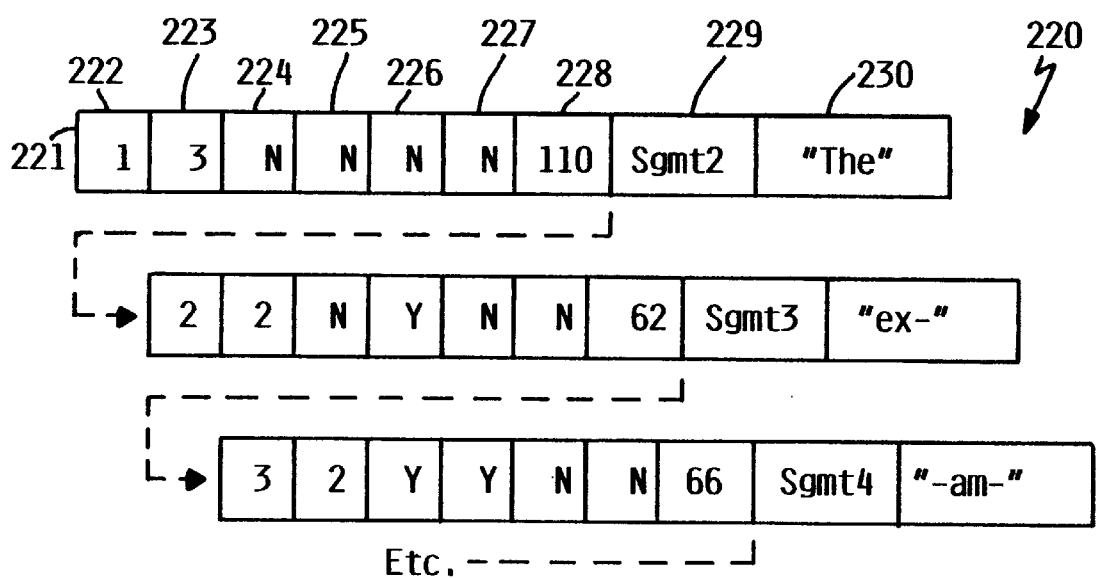
Figure 2C:
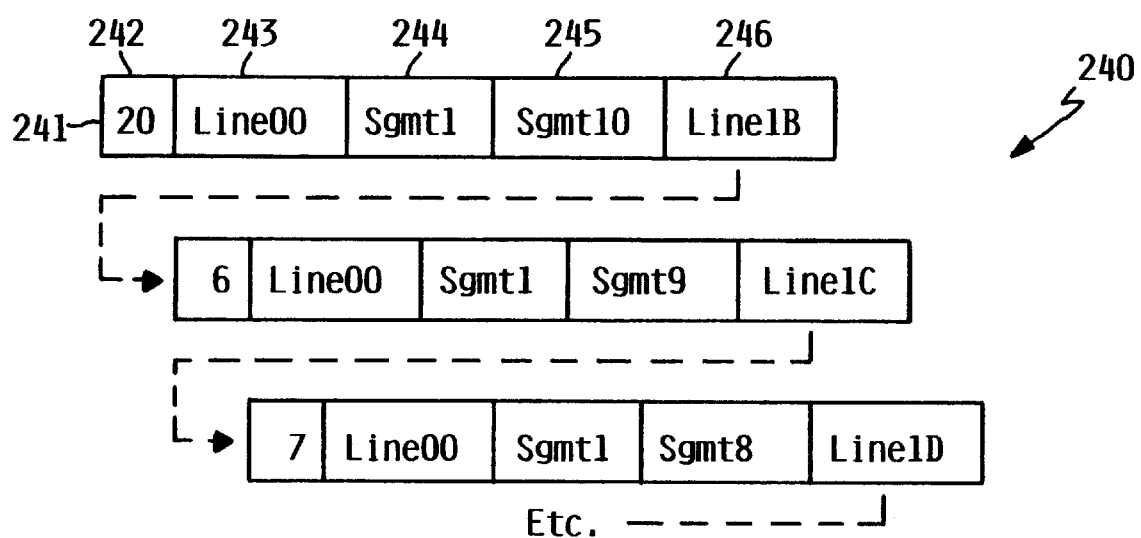

FIGS. 2A–2C show in greater detail some of the key data structures used by formatter 130 to perform the formatting function, in accordance with the preferred embodiment. These data structures include line pointer array 201, word segment list 220, and BestLine list 240.

Line pointer array 201, shown in FIG. 2A, is used as a form of index to lists 220 and 240. Each entry 202 in array 201 corresponds to a respective line of text in the paragraph, and contains two pointers to entries in lists 220 and 240. FirstSeg pointer field 204 points to the entry in word segment list 220 containing the first segment of the corresponding line, when the paragraph is formatted according to a maximum fit algorithm. This information is used for pruning line permutations, as described more fully herein.

BestLine pointer field 205 points to the first entry in Best-Line list 240 for the corresponding line.

Word segment list 220 is a linked list, containing sequential entries corresponding to each respective word segment in the paragraph. Each entry 221 contains the following nine fields. Sequence number field 222 contains the sequence number of the word segment. Letter count field 223 contains the number of letters in the word segment; this information is useful in determining the amount of letterspacing required between each letter of a line, without the need to parse each word of text. Hyphen left field 224 is a flag field indicating whether the word segment is hyphenated at the left, i.e., it is part of a larger word, but not the first segment of that word. Hyphen right field 225 is a flag field indicating whether the word segment is hyphenated at the right, i.e., is part of a larger word, but not the last segment of that word. ExSpace field 226 is a flag field indicating that two spaces (instead of the normal one) lie between the word segment and the word segment which immediately follows it; this might be used at the end of a sentence, following a colon, or in other situations. NoSpace field 227 is a flag field indicating that no space lies between the word segment and the word segment which immediately follows it; this might be used, e.g., between two words joined by a hyphen. Length field 228 contains a number representing the length of the characters in the word segment, given the current font in use. Because this information is repeatedly required by the formatter in generating multiple permutations of lines, as explained below, the length is saved in this field rather than parse the word segments each time a permutation is generated and formatted. Segment link field 229 contains a pointer to the next segment on the list (the last segment containing a null pointer). Text field 230 contains the actual text of the word segment. It will be understood that additional flag or other fields may be used to signal other special conditions.

BestLine list 240 is actually a set of linked lists. Each linked list of the set corresponds to one of the line numbers, the corresponding entry in BestLine field 205 pointing to the head of the list. Each entry 241 in BestLine list 240 corresponds to a saved (unpruned) permutation of a line, and contains the following five fields. Weighted score field 242 contains the weighted score of the permutation. Source permutation field 243 contains a pointer to the entry in BestLine list 240 corresponding to the permutation of the previous line from which the current permutation was generated. For the first line, all of these pointers are null. First segment field 244 points to the entry in word segment list 220 corresponding to the first word segment of the current permutation of the line. Last segment field 245 points to the entry in word segment list 220 corresponding to the last word segment of the line permutation. Bestline link field 246 points to the next entry on the list, the last entry containing a null pointer.

Figure 3:
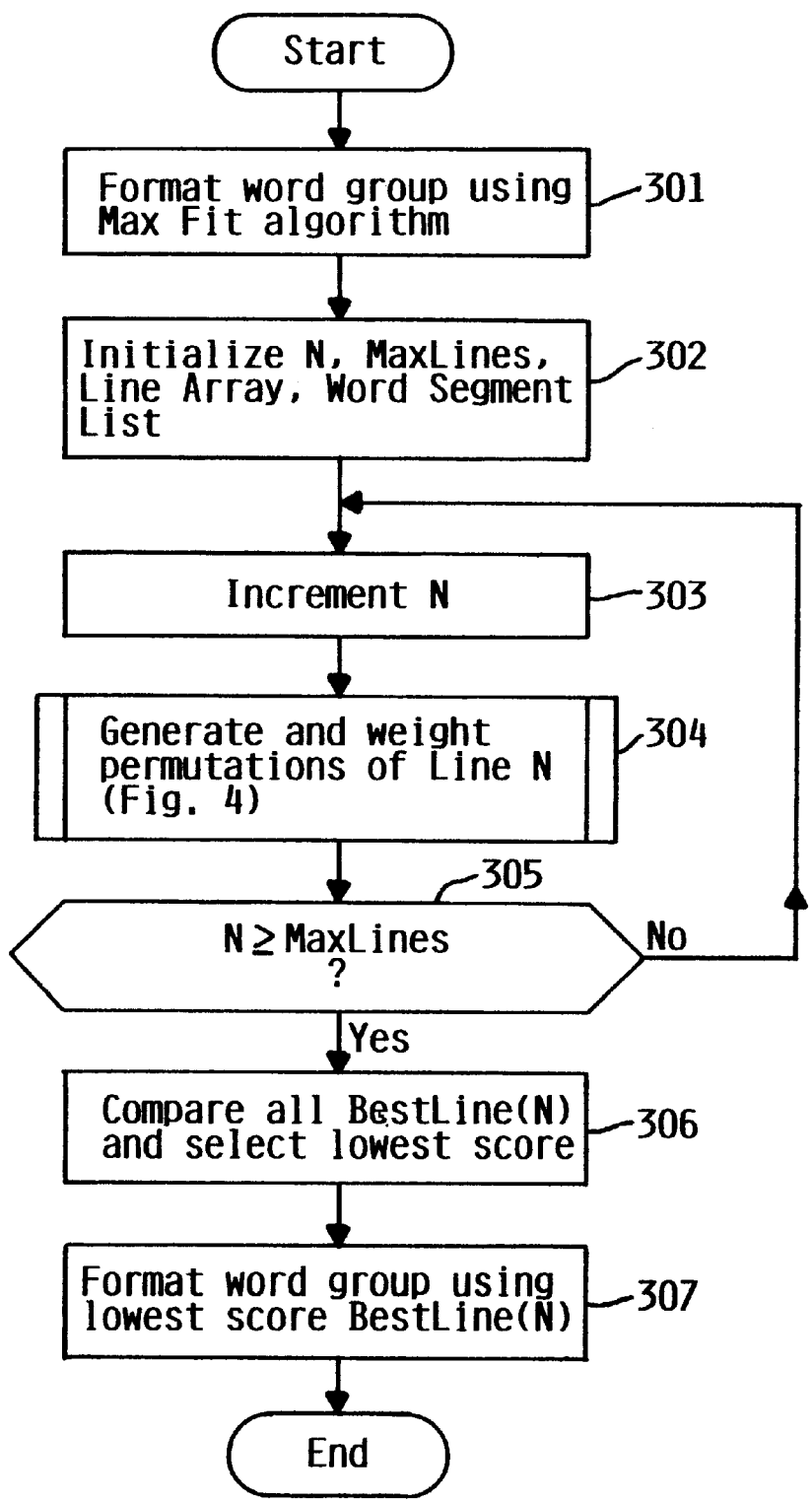
FIGS. 3 and 4 are flowcharts representing the steps followed by the formatter when formatting a word group, in accordance with the preferred embodiment.
Figure 4:
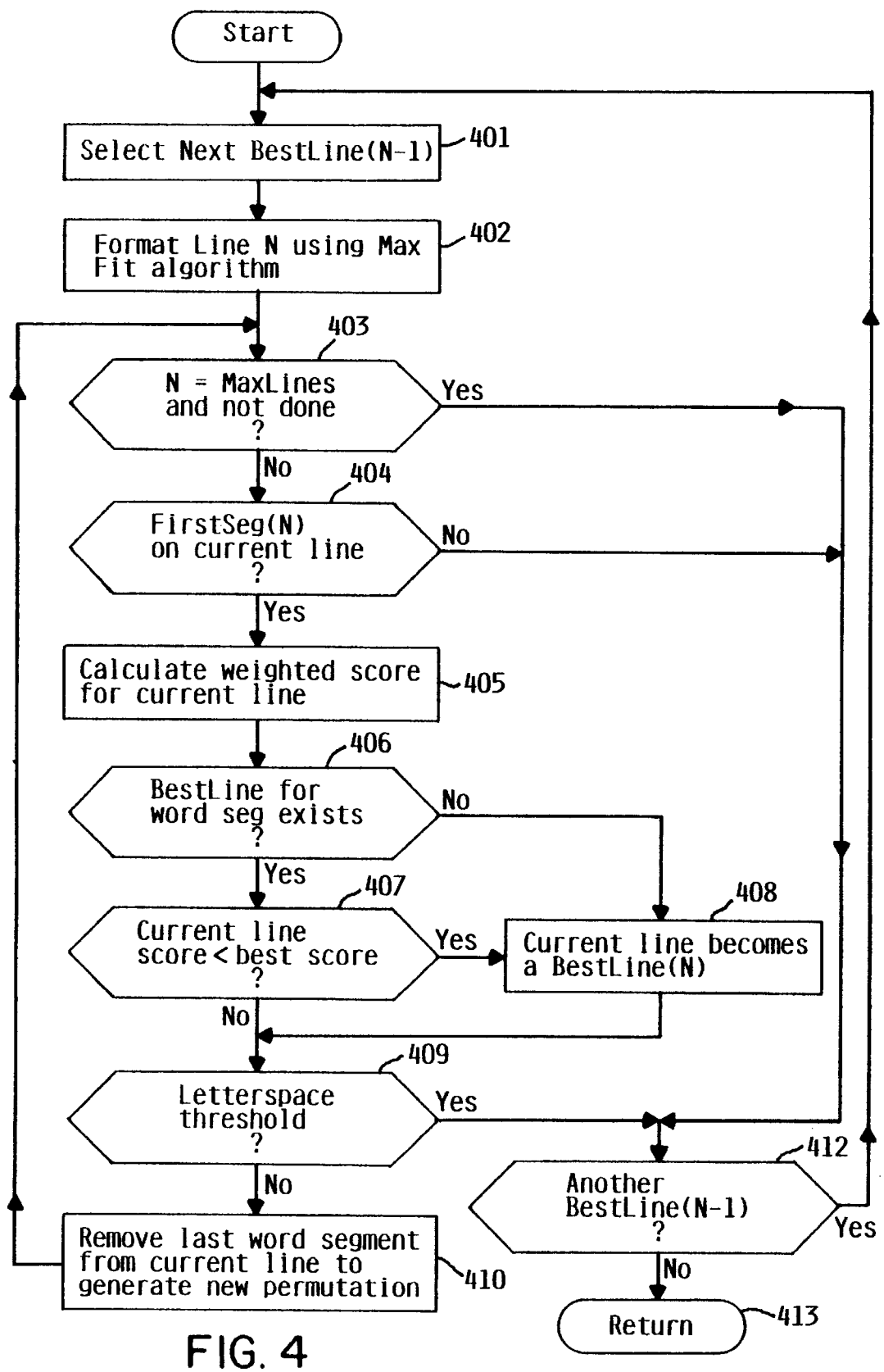

FIGS. 3 and 4 are flowcharts representing the steps followed by a word group formatter in accordance with the preferred embodiment. In this embodiment, a word group is a paragraph of text. The operation of formatter 130 according to the preferred embodiment is explained below first with respect to FIGS. 3 and 4, and later by reference to a specific example shown in FIGS. 5A and 5B.

The formatter begins by formatting the entire word group in accordance with a conventional maximum fit algorithm (step 301). This is done in order to determine the minimum number of lines required for the paragraph, since a maximum fit algorithm always formats using a minimum number of lines. The goal is to find an optimum formatting of the paragraph, which does not exceed this minimum number.

With the word group formatted, certain variables and data structures are initialized (step 302). In particular, N (representing the line number being currently worked on) is initialized to 0, and MaxLines is initialized to the number of lines required to format the paragraph using the maximum fit algorithm. Word segment list 220 is created from the results of parsing the paragraph of text, and appropriate data is entered in its fields. Line pointer array 201 is also initialized, with FirstSeg fields 204 pointing to the appropriate entries in word segment list 220. At this point, the BestLine fields 205 will contain null pointers, no permutations having yet been generated.

At step 303, line number N is incremented to begin working on the next sequential line. The formatter then generates the various permutations of line N and assigns each a weighted value. This step is represented in FIG. 3 as step 304, and is expanded to show in greater detail the steps required in FIG. 4.

Referring to FIG. 4, the permutations are generated by first selecting one of the unpruned permutations in the BestLine data structure corresponding to the previous line, i.e., line (N−1) (step 401). Line N−1 will end at a particular word segment. The formatter then formats Line N using a maximum fit algorithm, beginning with the word segment immediately following the end of Line N−1 (step 402). This formatting of Line N becomes the first permutation of Line N.

If Line N is the last line (i.e., N=MaxLines), it is not necessary to further consider any permutation which does not complete the paragraph. Therefore, if N=MaxLines and the final word segment of the paragraph does not fit on the current permutation of Line N (step 403), this permutation is immediately rejected by going to step 412.

The formatter then considers the current permutation of Line N and determines whether the first word segment according to a maximum fit algorithm is contained in the current permutation. It determines this by referring to FirstSeg entry 204 in line number array 201 corresponding to Line N (hereinafter referred to as FirstSeg(N)), which was previously initialized at step 302. A minimum of (MaxLines−N+1) lines are required according to the maximum fit algorithm to contain all word segments including and following FirstSeg(N). Therefore, if FirstSeg(N) is not contained in the current permutation of Line N, then the minimum number of lines required for formatting the paragraph using the current permutation will be N+(MaxLines−N+1)=MaxLines+1. Because the current permutation would, therefore, cause the paragraph to format in more than the minimum number of lines, the current permutation is immediately rejected by going to step 412. If FirstSeg(N) is contained in the current permutation, analysis of the current permutation continues at step 405.

The formatter then calculates a weighted score for the current permutation of Line N (step 405). The weighted score is a measure of the "goodness" of a particular permutation, the lowest weighted score being considered best. In the preferred embodiment, the weighted score is computed according to the following formula:

$$S_N = S_{(N-1)} + \Delta_{SeqNum} + F_{Space} + G_{Hyphen}$$

where:

| | |
|---|---|
| $S_N$ | is the weighted score of the current permutation of Line N; |
| $S_{(N-1)}$ | is the weighted score of the permutation of Line N − 1 from which the current permutation of N was derived; |
| $\Delta_{SeqNum}$ | is the difference between the sequence numbers of the final word segment of the current permutation of Line N and the final word segment of Line N in a maximum fit algorithm; |
| $F_{Space}$ | is a function representing the deviation from ideal word and/or letter spacing in the current permutation; and |
| $G_{Hyphen}$ | is a function representing the undesirable effects of hyphenation. |

In the preferred embodiment described herein and shown in the example, $F_{Space}$ is 5 points where spacing between words exceeds a first threshold (about ⅛ inch, using the font and size shown in the example), but is insufficient to trigger letterspacing; 20 points where letterspacing is triggered but space between individual letters does not exceed the letterspacing threshold; and 40 points where space between individual letters exceeds the letterspacing threshold. These values are chosen largely for simplicity of implementation and illustration. It will be understood that many variations in the implementation of the function $F_{Space}$ are possible, and the function could be considerably more sophisticated. For example, $F_{Space}$ could be graduated in finer increments, and could be adjusted to represent both positive and negative deviations from an ideal spacing between words. Where ragged right justification is used, $F_{Space}$ would either be omitted or would be substantially different, since all word spaces in ragged right are usually the same. E.g., in ragged right, $F_{Space}$ might represent the positive or negative deviation of the end of the line from some ideal value.

In the preferred embodiment, the function $G_{Hyphen}$ is 20 points if the final word segment of the line is hyphenated; 5 additional points are added if the final word segment is hyphenated such that only two letters of the word are placed on Line N or Line N+1; and 20 additional points are added if the final word segment is hyphenated such that one letter of the word is placed on Line N. Again, it will be understood that many variations in the implementation of this function are possible.

As can be seen, the weighted score will tend to avoid letterspacing and hyphenation. It also assigns a lower (better) score to hyphenation in the middle of a word than near the ends. However, none of these preferences is absolute. The weighted score is in effect a judgment as to which formatting is best, and in some cases hyphenation or less than optimal spacing may be chosen in order to avoid some other effect. Finally, the $\Delta_{SeqNum}$ factor gives a slight preference to the maximum fit of words on a line, other factors being more or less equal.

When generating permutations and computing weighted scores, it is not actually necessary to reformat each permutation in the sense of parsing individual characters, since all the required information is contained in the data structures, particularly word segment list 220. I.e., from length field 228 it is possible to determine the total length of characters on a line. Right hyphen field 225 of the last word segment determines whether it is necessary to add a hyphen. A count of the number of words together with ExSpace and NoSpace fields 226 and 227 will determine the number of spaces required. With this information, it will be possible to determine whether letterspacing is required, and the total amount of additional space required. From the total amount of additional space required and the number of letters (from letter count field 223), it is possible to determine if a letterspacing threshold is exceeded. Similarly, the existence of hyphenation conditions can be determined by reference to fields 224 and 225. Thus, the weighted score can be computed by simple integer arithmetic from the available data structures, without need to parse individual characters.

After the formatter calculates the weighted score for the current line, it examines BestLine list 240 to determine whether any permutation of Line N has been stored which ends in the same word segment as the current permutation of Line N (step 406). Specifically, it refers to BestLine field 205 of array 201 to obtain the head of the list 240 corresponding to Line N, and scans the list for a list entry 241 having a last segment field 245 equal to the last segment of the current permutation. If such an entry exists, the score of the entry in the list (stored in weighted score field 242) is compared with the score of the current permutation (step 407). If either there is no previously stored permutation, or if the current permutation has a better (lower) score than the previously stored permutation, then the current permutation is stored in BestLine list 240 as a saved permutation, replacing the previously stored permutation if necessary (step 408).

The formatter then determines whether a letterspacing threshold has been exceeded for the current permutation (step 409). I.e., does the current permutation use letterspacing, and are individual letterspaces in excess of a predetermined threshold. If not, another permutation is generated (step 410) by removing the last word segment from the current permutation, and repeating the previously described steps from step 403. If the threshold is exceeded, it is considered extremely unlikely that acceptable permutations will be generated by further removal of word segments (i.e., further increasing the amount of letterspacing required). In that event, the formatter examines best line list 240 for the next saved permutation of previous line (N−1) (step 412), and repeats starting with step 401 if additional permutations of Line N−1 have not been considered. After all permutations of Line N−1 that were saved in BestLine list 240 have been considered, the formatter returns (step 413), having completed its analysis of Line N.

The formatter then determines whether N has reached the limit of MaxLines, indicating that all lines have been permuted (step 305). If not, it repeats steps 303–305. If all lines have been permuted, the formatter then compares the weighted scores of all saved permutations of Line N in BestLine list 240 (step 306). The lowest weighted score represents the best formatting of the paragraph. The formatter then constructs the formatted paragraph in final form by beginning with lowest scoring permutation of Line N, and following links in source permutation field 243 to each successive previous line permutation which resulted in the final lowest score (step 307).

Referring to the example paragraph of text of FIGS. 5A and 5B, one may observe how the formatting procedure described above formats a particular paragraph. FIG. 5A shows an example of a paragraph of text formatted according to a prior art "maximum fit" algorithm, i.e., each line is sequentially formatted individually, by placing thereon the maximum number of word segments which will fit. In this example, ten lines are required given the formatting constraints of font size, margins, tab set, hyphenation, etc. FIG. 5B shows the formatted paragraph in final form, according to the preferred embodiment. FIGS. 6A through 6J represent different formatting permutations considered by the formatter in formatting the example paragraph, as explained below. Each of FIGS. 6A through 6J contains three columns. Each line within a figure represents a single permutation of a text line. The left-most column in each figure represents a line number designation for the permutation, e.g. "2A" signifies the second line of text, variant "A". The middle column shows the designation of the previous line number variant from which the permutation was derived, plus the text of the current line permutation. E.g., permutation 2A shown in FIG. 6B was derived from permutation 1A, and contains the text "plete as to all matters, except that in" on the second line. The designator for the line from which the current permutation is derived is a shorthand version for the text of that permutation, including the permutations from which it was derived. The right-most column represents the computation of weighted score for the permutation, showing the four elements in the order they appear in the equation above.

The example paragraph of FIGS. 5A and 5B is first formatted using the maximum fit algorithm (step 301) to yield the result shown in FIG. 5A. Since this formatted paragraph contains 10 lines, MaxLines is set to 10 and other variables and data structures are initialized appropriately (step 302). With N set to 1 (first line), the procedure of FIG. 4 is called to generate permutations of Line N (step 304).

For Line 1, all permutations must begin with the same word segment, i.e., the first word segment of the paragraph. For Line 0, there is deemed to be only a single permutation, that being a null line. This null line is, therefore, chosen at step 401. Line 1 is then formatted according to the maximum fit algorithm (step 402) to yield the formatted permutation designated Line 1A in FIG. 6A.

Since N<MaxLines (step 403) and FirstSeg(1) (the word "The") is contained in Line 1A (step 404), the formatter proceeds to compute a weighted score for Line 1A (step 405). The computation of weighted scores is shown in the right-most column of FIGS. 6A through 6J. For Line 1A, the weighted score is 20, the 20 points being a result of hyphenating the final word segment (see FIG. 6A).

The formatter then searches BestLine list 240 to determine if a BestLine entry for Line 1 exists which ends in the word segment "com-", i.e., the final word segment of the current permutation, Line 1A (step 406). This being the first line considered, there will be no such BestLine entry. The formatter, therefore, adds Line 1A to the BestLine list 240 for Line 1 (step 408).

The formatter then considers whether the letterspace threshold has been exceeded (step 409). There being no letterspacing in Line 1A, the threshold has not been exceeded. The formatter, therefore, generates a new permutation by removing the word segment "com-" from Line 1A (step 410). This new permutation is shown designated Line 1B in FIG. 6A.

The formatter then repeats the steps beginning with step 403. Again, Line 1B is not rejected out of hand, and a weighted score is computed at step 405. In this case, the weighted score is 6 (one point for the $\Delta_{SeqNum}$, and 5 additional points because spacing between words has exceeded the first threshold of the $F_{Space}$ function). Because no BestLine for Line 1 exists which ends in the word segment "be", Line 1B is also added to the list of BestLine permutations for Line 1 (step 408).

The formatter repeats the process two more times to generate the permutations designated 1C and 1D in FIG. 6A. Each of these permutations is saved as a BestLine entry in BestLine list 240, because each one ends in a different word segment. The weighted scores for these two permutations, as indicated in the right column of FIG. 6A, are 7 and 43, respectively. Line 1C receives 2 points because two word segments, "be" and "com-", are missing. Line ID similarly receives 3 points because the word segments "will", "be", and "com-", are missing, plus 40 additional points because significant letterspacing is required.

After computing the weighted score for Line 1D and saving the permutation as a BestLine in BestLine list 240, the formatter determines at step 409 that the letterspace threshold has been exceeded for Line 1D. It, therefore, does not generate further permutations by removing another word segment from Line 1D. Instead, the formatter goes to step 412. As mentioned previously, Line 1 being the first line, there is only a single null BestLine(0). Put another way, there is only one way that Line 1 can begin. The procedure, therefore, returns at step 413. N not yet exceeding MaxLines (step 305), N is incremented to 2, and the procedure of FIG. 4 called again.

The procedure of FIG. 4 begins by taking the first saved BestLine permutation for Line 1 from BestLine list 240, i.e., Line 1A (step 401), and formatting Line 2 from Line 1A using a maximum fit algorithm (step 402). I.e., a permutation of Line 2 is generated starting from where Line 1A ended. This permutation is shown in FIG. 6B, designated Line 2A. Neither condition for immediate rejection of step 403 or 404 is met, so the formatter calculates a weighted score, which in this case is 20. The weighted score is calculated by adding the weighted score of Line 1A (which is 20) plus 0 points for the $\Delta_{SeqNum}$, 0 points for $F_{Space}$ and 0 points for $G_{Hypen}$. Permutation 2A being the only one ending in "in", it is saved as a BestLine for Line 2 at step 408. I.e., a new BestLine list 240 is created for Line 2, having permutation 2A as its first entry, and field 205 entry for line 2 in line array 201 is updated to point to the new BestLine list.

The formatter then generates four additional permutations from Line 1A, designated Lines 2B, 2C, 2D and 2E. These permutations are assigned weighted scores 21, 27, 53 and 64 respectively using the formula previously described, and are saved as BestLines. After saving Line 2E, the formatter determines at step 409 that the letterspacing threshold has been exceeded in Line 2E. It, therefore, goes to step 412 to determine if another BestLine for Line 1 exists.

Since all five permutations of Line 1 were saved as BestLines, and at this point the formatter has only considered permutation 1A, it goes back to step 401 to select the next BestLine for Line 1, i.e., Line 1B. Another permutation of Line 2 is then generated from Line 1B, using the maximum fit algorithm (step 402). This permutation is designated 2F in FIG. 6B.

The formatter computes a weighted score of 7 for Line 2F as previously described (step 405). However, at step 406, the formatter determines that there already exists an entry in BestLine list 240 ending in the same word segment. I.e., both Line 2B and Line 2F end in the word segment "that". Since Line 2F has a lower (better) weighted score, the "Yes" branch is taken from step 407. Line 2F therefore replaces Line 2B as a BestLine, so that Line 2B is no longer on the list of BestLines.

By removing Line 2B from the list of BestLines, it will not be necessary to generate further permutations from Line 2B when evaluating subsequent lines of text. This "pruning" of lines is significant to the practical working of the text formatting algorithm of the preferred embodiment. If lines are not pruned, the total number of permutations will grow exponentially with the number of lines. For paragraphs of even modest size, the number of permutations could easily exceed the practical capabilities of the computer system. According to the algorithm of the preferred embodiment, lines are aggressively pruned so that the total number of permutations grows roughly linearly with the number of lines. This pruning makes the analysis described herein well within the capabilities of typical personal computer systems.

The formatter continues to generate additional permutations 2G, 2H, 2I and 2J from Line 1B. Lines 2G, 2H, and 2I are saved as BestLines for the same reason that line 2F was saved, replacing Lines 2C, 2D and 2E, respectively (which are "pruned). In the case of Line 2J, there is no permutation ending in "mat-", so this word segment is also saved by taking the "no" branch from step 406.

After evaluating Line 2J, the formatter again determines that the letterspacing threshold has been exceeded at step 409, and repeats step 401 to select the next permutation, Line 1C. It then generates permutations 2K through 2O from Line 1C, as shown in FIG. 6B. Line 2K is pruned by taking the "no" branch from step 407, because its score (9) is higher than that of Line 2G (8), which also ends in the same word segment "-cept". Lines 2L, 2M and 2N replace lines 2H, 2I and 2J, respectively, as BestLines, pruning the latter three lines. Line 2O is saved as a BestLine, being the only line ending in "all".

The formatter repeats the process to generate permutations from Line 1D. These permutations are designated 2P through 2T, as shown in FIG. 6B. Of these, only permutation 2T is saved, it being the only permutation ending in "to". All other permutations (2P through 2S) are pruned, because their weighted scores in every case are higher than the weighted scores of the previously saved BestLines ending in the same word segment.

After evaluating Line 2T, the formatter determines at step 412 that no more permutations of Line 1 exist on BestLine list 240, and returns at step 413. At this point, the formatter has saved as BestLine permutations Lines 2A, 2F, 2G, 2L, 2M, 2N, 2O, and 2T. All other permutations have been pruned. The saved permutations are indicated in FIG. 6B with arrows.

The formatter then increments the number N of the current line (step 303), and repeats the process to generate the permutations of Line 3. These permutations are shown in FIG. 6C. As explained, permutations of Line 3 are only generated from the saved BestLine permutations of Line 2 listed above. No permutations of Line 3 are generated from line 2E, for example. The permutations of Line 3 which are saved as BestLines are Lines 3D, 3H, 3I, 3J, 3S, 3T, 3X, 3Y, 3Z and 3AF, as indicated in FIG. 6C.

In FIG. 6C, it will be noted that the permutations generated from Lines 2O and 2T stop before the letterspacing threshold is exceeded. This is so because the removal of the last word segment "ap-" from, e.g., Line 2O, causes the branch at step 404 to be taken. In other words, this permutation is immediately rejected because it would cause the formatted paragraph to exceed 10 lines.

The formatter repeats the above process to generate permutations for Lines 4–10. The generated permutations and their weighted scores are shown in FIGS. 6D through 6J, respectively.

When the formatter generates permutations of the final line (Line 10), only three permutations are evaluated. All other possibilities cause at least one word segment to wrap to the next line. The formatter immediately rejects any such possibilities by taking the "yes" branch from step 403.

After generating the permutations of Line 10, the formatter takes the "yes" branch from step 305. It then compares the weighted scores of the Line 10 permutations (step 306). In this example, Line 10C is selected as the optimum permutation, having the lowest cumulative weighted score.

The formatter then reconstructs the formatted paragraph in optimal form by following the series of links in source permutation fields 243 back from Line 10C, saved as a BestLine (step 307). I.e., permutation 10C was generated from 9H, and the BestLine entry 241 of Line 10C contains a link to Line 9H in field 243. The entry for Line 9H similarly contains a link in its field 243 to Line 8F, which follows a successive chain of links to Lines 7F, 6B, 5A, 4A, 3D, 2F and 1B. The formatted paragraph in final form contains these lines, and is shown in FIG. 5B.

In comparing the two paragraphs of FIGS. 5A and 5B, it will be observed that the total number of lines required is the same in either case. It will further be observed that the improved formatting of the present invention reduces, but does not entirely eliminate, hyphenation. It was necessary to hyphenate the word "examiner" in order to make the paragraph fit within 10 lines, but the other hyphenations proved unnecessary. As a result of removing hyphenations, the readability of the paragraph is improved, without using additional lines or changing the font. It will also be observed that, if one were to simply turn off hyphenation entirely in accordance with prior art techniques, a greater number of lines would be required to format the paragraph.

In the preferred embodiment described above, a particular formula is used for providing a weighted score to permutations of text lines for purposes of judging which is best. It would be possible to employ any number of variations on this formula to take into account other factors, or to ignore factors taken into account by the formula described herein, or to change the relative weightings of the factors. It would further be possible to allow the user to customize the weighting factors.

It is believed that the algorithm described above will generally yield the best possible formatting within the given constraints. However, it would alternatively be possible to employ simpler algorithms which would improve upon the conventional maximum fit formatting. Although such simpler algorithms would not necessarily provide results as good as those provided by the algorithm of the preferred embodiment, they could generally be implemented more easily and would generally execute faster. An example of such an alternative is described below.

In this alternative algorithm, the "word group" consists of only a few lines of text, perhaps two. The formatter first formats a larger block of text, such as a paragraph, according to a maximum fit algorithm. It then searches the formatted text for triggering conditions, e.g., letterspacing or hyphenation. These are conditions to be avoided. If it finds such a triggering condition, it considers a word group in the vicinity of the line of text containing the condition. In a simple example, illustrated in FIGS. 7A and 7B, it considers only two lines, being the line of text containing the triggering condition (in this case, letterspacing) and the immediately preceding line of text. It then determines whether a word or word segment can be moved from the immediately preceding line to the line containing the letterspacing, thus avoiding the letterspacing. In the example, FIG. 7A shows a paragraph of text formatted according to a maximum fit algorithm. In this example, hyphenation is not used. The alternative algorithm described above notes the triggering condition (letterspacing) on the fourth line, then creates a word group consisting of the third and fourth line. If the final word of the third line can be moved to the fourth line, without triggering letterspacing on the third line, the formatter does so. FIG. 7B shows the resulting text after moving a word down from the third line. Of course, this simplified algorithm can be extended to three or more line word groups. Where hyphenation is the triggering condition, it should include the line having the triggering condition and line(s) immediately following that line.

In the examples shown above, the text is formatted in a proportional spaced font and is right/left justified in fairly narrow columns. These formatting parameters are typical of a newspaper, in which space is at a premium, and it is necessary to place as many words as possible within a given area. It is expected that the greatest formatting improvement results under such circumstances, i.e., when columns are narrow, full justified, and in proportional spaced font. These examples should not be construed to limit the invention to such formatting parameters. The present invention could be applied to different formatting parameters, but the improvement is likely to be less noticeable. For example, if a "ragged right" margin is specified, letterspacing is typically not used. Similarly, if columns are very wide, letterspacing becomes less likely. Furthermore:, where wide columns are used, the need for hyphenation to conserve space is reduced, so that the user may simply turn hyphenation off altogether (an option supported by most word processors).

In the preferred embodiment described above, the formatter is part of a word processing program executing on a general purpose computer system, specifically a personal computer. Such word processing programs typically include editing, saving, displaying, and other functions, as are well known in the art. However, it would be possible to practice the invention described herein in any of various alternative environments. For example, the computer system may be a large mainframe computer having multiple workstations attached thereto. The computer system may be general purpose, or it may be a special purpose system designed solely for word processing or other tasks. It may be a system used for composition and layout of newspapers or other publications. It may also be a special purpose electronic typewriter, having a built-in program for word processing. The formatter could be part of a larger multi-function program, or it could function separately as a stand-alone software program, taking a text file as input and formatting it according to the present invention. It will be further understood that the output device could be display or a printer for immediate rendition of text in human readable form, or could be some intermediate device, where the text is ultimately intended to be rendered in some human readable form. E.g., the text might be stored as an electronic record on a computer readable medium, or might be output to a typesetting or other intermediate printing apparatus for producing type, negatives, masters, or other products, which are ultimately used to render the text in human readable form.

While word processing program 121 is shown in FIG. 1 residing in random access memory 103 of computer system 101, it will be understood that such a word processing program may be embodied as a sequence of processor-executable instructions stored on a computer readable medium, for sale or other distribution as a computer program product. The medium may include, by way of example, a magnetic floppy disk, magnetic tape, CD-ROM disk, or other medium. Furthermore, word processing program 121 may be transmitted by electronic means, such as the Internet, for downloading into a memory or storage device of a computer system.

Although a specific embodiment of the invention has been disclosed along with certain alternatives, it will be recognized by those skilled in the art that additional variations in form and detail may be made within the scope of the following claims:

We claim:

1. A method for automatically formatting text in a word processing device, comprising the steps of:

identifying a plurality of sequential word segments to be formatted as a word group;

determining a minimum number of lines required for formatting said word group consistent with prespecified formatting parameters;

generating a plurality of potential formatted versions of said word group consistent with said prespecified formatting parameters, each of said plurality of potential formatted versions occupying no more than said minimum number of lines;

determining a best version of said plurality of potential formatted versions, said, best version being determined according to at least one prespecified criterion; and selecting said best version as the formatted text of said word group.

2. The method for automatically formatting text of claim 1, wherein said step of determining a best version comprises assigning a respective numerical weighted score to each of said plurality of potential formatted versions, said numerical weighted score being based on said at least one prespecified criterion.

3. The method for automatically formatting text of claim 1, wherein said step of determining a best version comprises determining said best version according to a plurality of prespecified criteria.

4. The method for automatically formatting text of claim 1, wherein said at least one prespecified criterion comprises word hyphenation.

5. The method for automatically formatting text of claim 1, wherein said at least one prespecified criterion comprises letterspacing.

6. The method for automatically formatting text of claim 1, wherein said step of generating a plurality of potential formatted versions of said word group comprises the steps of:

generating a plurality of potential formatted versions of an Nth line of said word group, said plurality of potential formatted versions of said Nth line being generated by beginning said Nth line from a plurality of different word segments, each of said plurality of different word segments being contained in a respective saved potential formatted version of an (N−1)th line;

saving at least some of said plurality of potential formatted versions of said Nth line;

repeating said generating and saving steps for a plurality of lines.

7. The method for automatically formatting text of claim 6, wherein said step of generating a plurality of potential formatted versions of said word group further comprises the step of pruning at least some of said plurality of potential formatted versions of said Nth line, wherein versions of an (N+1) line are not generated from potential formatted versions of said Nth line so pruned.

8. A method for automatically formatting text in a word processing device, comprising the steps of:

identifying a plurality of sequential word segments to be formatted as a word group;

determining a minimum number of lines required for formatting said word group consistent with prespecified formatting parameters;

allocating said plurality of sequential word segments to a plurality of sequential lines equal to said minimum number, wherein for at least one Nth line of said plurality of sequential lines ending with an Mth word segment of said word group, sufficient space exists on said Nth line to include an (M+1)th word segment immediately following said Mth word segment, said allocating step being performed consistent with said prespecified formatting parameters.

9. The method for automatically formatting text of claim 8, wherein said M+1th word segment is placed on a line subsequent to said Nth line to avoid hyphenation.

10. The method for automatically formatting text of claim 8, wherein said M+1th word segment is placed on a line subsequent to said Nth line to reduce spacing between letters of at least one word.

11. A method for automatically formatting text in a word processing device, comprising the steps of:

identifying a plurality of sequential word segments to be formatted as a word group;

formatting said word group in accordance with a maximum fit algorithm to produce a first formatted version of said word group;

identifying an undesirable condition in said first formatted version;

formatting said word group to produce a second formatted version of said word group which does not contain said undesirable condition, said second formatted version having the same number of lines as said first formatted version.

12. The method for automatically formatting text of claim 11, wherein said undesirable condition in said first formatted version comprises a hyphenated word.

13. The method for automatically formatting text of claim 11, wherein said undesirable condition in said first formatted version comprises spacing between letters of at least one word.

14. The method for automatically formatting text of claim 11, wherein said step of identifying an undesirable condition comprises assigning a numerical weighted score to said first formatted version, said numerical weighted score being based on said at least one prespecified criterion.

15. A computer program product for formatting textual data, said computer program product including a plurality of computer executable instructions stored on a computer readable medium, wherein said instructions, when executed by a computer, cause the computer to perform the steps of:

identifying a plurality of sequential word segments to be formatted as a word group;

determining a minimum number of lines required for formatting said word group consistent with prespecified formatting parameters;

generating a plurality of potential formatted versions of said word group consistent with said prespecified formatting parameters, each of said plurality of potential formatted versions occupying no more than said minimum number of lines;

determining a best version of said plurality of potential formatted versions, said best version being determined according to at least one prespecified criterion; and selecting said best version as the formatted text of said word group.

16. The computer program product of claim 15, wherein said step of determining a best version comprises assigning a respective numerical weighted score to each of said plurality of potential formatted versions, said numerical weighted score being based on said at least one prespecified criterion.

17. The computer program product of claim 15, wherein said step of determining a best version comprises determining said best version according to a plurality of prespecified criteria.

18. The computer program product of claim 15, wherein said at least one prespecified criterion comprises word hyphenation.

19. The computer program product of claim 15, wherein said at least one prespecified criterion comprises letterspacing.

20. The computer program product of claim 15, wherein said step of generating a plurality of potential formatted versions of said word group comprises the steps of:

generating a plurality of potential formatted versions of an Nth line of said word group, said plurality of potential formatted versions of said Nth line being generated by beginning said Nth line from a plurality of different word segments, each of said plurality of different word segments being contained in a respective saved potential formatted version of an (N−1)th line;

saving at least some of said plurality of potential formatted versions of said Nth line;

repeating said generating and saving steps for a plurality of lines.

21. The computer program product of claim 20, wherein said step of generating a plurality of potential formatted versions of said word group further comprises the step of pruning at least some of said plurality of potential formatted versions of said Nth line, wherein versions of an (N+1) line are not generated from potential formatted versions of said Nth line so pruned.

22. A word processing apparatus, comprising:

a processor;

a memory system for storing textual data;

a formatting program executable on said processor for formatting said textual data, said formatting program including:

(a) means for determining a minimum number of lines required to format a word group of said textual data, and (b) means for generating an optimal formatted version of said word group according to at least one prespecified criterion, said optimal formatted version of said word group occupying said minimum number of lines, said optimal formatted version containing a non-maximal line ending with an Nth word segment of said word group, said non-maximal line having sufficient space to include an (N+1)th word segment of said word group immediately following said Nth word segment; and an output device for outputting said optimal formatted version of said word group in human readable form.

23. The word processing apparatus of claim 22, wherein said at least one prespecified criterion comprises word hyphenation.

24. The word processing apparatus of claim 22, wherein said at least one prespecified criterion comprises letterspacing.

25. The word processing apparatus of claim 22, wherein said means for generating an optimal formatted version comprises:

means for generating a plurality of potential formatted versions of said word group, each of said plurality of potential formatted versions occupying said minimum number of lines;

means for calculating a respective numerical weighted score for each of said plurality of potential formatted versions; and means for selecting a potential formatted version having a best numerical weighted score as said optimal formatted version.

* * * * *

UNITED STATES PATENT AND TRADEMARK OFFICE
CERTIFICATE OF CORRECTION

PATENT NO. : 6,223,191 B1
DATED : April 24, 2001
INVENTOR(S) : Roy Willfred Truelson It is certified that error appears in the above-identified patent and that said Letters Patent is hereby corrected as shown below:

Claim 6, should read in full as follows:

6. A method for automatically formatting text in a word processing device, comprising
the steps of:

identifying a plurality of sequential word segments to be formatted as a
word group;

determining a minimum number of lines required for formatting said word group consistent with prespecified formatting parameters;

generating a plurality of potential formatted versions of said word group consistent with said prespecified formatting parameters, each of said plurality of potential formatted versions occupying no more than said minimum number of lines, wherein said step of generating a plurality of potential formatted versions of said word group comprises the steps of:
    (a) generating a plurality of potential formatted versions of an Nth line of said word group, said plurality of potential formatted versions of said Nth line being generated by beginning said Nth line from a plurality of different word segments, each of said plurality of different word segments being contained in a respective saved potential formatted version of an (N-1)th line;
    (b) saving at least some of said plurality of potential formatted versions of said Nth line; and
    (c) repeating said steps (a) and (b) for a plurality of lines;

determining a best version of said plurality of potential formatted versions, said best version being determined according to at least one prespecified criterion; and selecting said best version as the formatted text of said word group.

UNITED STATES PATENT AND TRADEMARK OFFICE
CERTIFICATE OF CORRECTION

PATENT NO. : 6,223,191B1
DATED : April 24, 2001
INVENTOR(S) : Roy Willfred Truelson It is certified that error appears in the above-identified patent and that said Letters Patent is hereby corrected as shown below:

Claim 10, should read in full as follows:

10. A method for automatically formatting text in a word processing device, comprising the steps of:

identifying plurality of sequential word segments to be formatted as a word group;

determining a minimum number of lines required for formatting said word group consistent with prespecified formatting parameters;

allocating said plurality of sequential word segments to a plurality of sequential lines equal to said minimum number, wherein for at least one Nth line of said plurality of sequential lines ending with an Mth word segment of said word group, sufficient space exists on said Nth line to include an (M+1) th word segment immediately following said Mth word segment, said allocating step being performed consistent with said prespecified formatting parameters, wherein said M+1th word segement is placed on a line subsequent to said Nth line to reduce spacing between letters of at least one word.

Claim 11 should read in full as follows:

11. A method for automatically formatting text in a word processing device, comprising the steps of:

identifying a plurality of sequential word segments to be formatted as a word group;

formatting said word group in accordance with a maximum fit algorithm to produce a first formatted version of said word group;

identifying an undesirable condition in said first formatted version;

formatting said word group to produce a second formatted version of said word group which does not contain said undesirable condition, said second formatted version including at least one word segment which is assigned to a different line than that to which it is assigned in said first formatted version, said second formatted version having the same number of lines as said first formatted version.

UNITED STATES PATENT AND TRADEMARK OFFICE
CERTIFICATE OF CORRECTION

PATENT NO. : 6,223,191 B1
DATED : April 24, 2001
INVENTOR(S) : Roy Willfred Truelson It is certified that error appears in the above-identified patent and that said Letters Patent is hereby corrected as shown below:

Claim 20, should read in full as follows:

20. A computer program product for formatting textual data, said computer program product including a plurality of computer executable instructions stored on a computer readable medium, wherein said instructions, when executed by a computer, cause the computer to perform the steps of:

identifying a plurality of sequential word segments to be formatted as a word group;

determining a minimum number of lines required for formatting said word group consistent with prespecified formatting parameters;

generating a plurality of potential formatted versions of said word group consistent with said prespecified formatting parameters, each of said plurality of potential formatted versions occupying no more than said minimum number of lines, wherein said step of generating a plurality of potential formatted versions of said word group comprises the steps of:
   (a) generating a plurality of potential formatted versions of an Nth line of said word group, said plurality of potential formatted versions of said Nth line being generated by beginning said Nth line from a plurality of different word segements, each of said plurality of different word segments being contained in a respective saved potential formatted version of an (N-1) th line;
   (b) saving at least some of said plurality of potential formatted versions of said Nth line; and;
   (c) repeating said steps (a) and (b) for a plurality of lines;

determining a best version of said plurality of potential formatted versions, said best version being determined according to at least one prespecified criterion; and selecting said best version as the formatted text of said word group.

UNITED STATES PATENT AND TRADEMARK OFFICE
CERTIFICATE OF CORRECTION

PATENT NO.    : 6,223,191B1
DATED         : April 24, 2001
INVENTOR(S)   : Roy Willfred Truelson It is certified that error appears in the above-identified patent and that said Letters Patent is hereby corrected as shown below:

<u>Claim 22, column 16,</u>
Line 32, following "said textual data" insert -- in accordance with a maximum fit algorithm -- .
Line 43, following "said Nth word segment" insert -- , said optimal formatted version including at least one word segment which is assigned to a different line than that to which it is assigned in accordance with said maximum fit algorithm --.

Signed and Sealed this

Thirteenth Day of November, 2001

Attest:

*Nicholas P. Godici*

NICHOLAS P. GODICI
*Acting Director of the United States Patent and Trademark Office*

*Attesting Officer*